United States Patent
Xu et al.

(10) Patent No.: US 10,459,936 B2
(45) Date of Patent: Oct. 29, 2019

(54) INFORMATION SEARCH METHOD AND APPARATUS

(71) Applicant: Huawei Technologies Co., Ltd., Shenzhen (CN)

(72) Inventors: Zhe Xu, Shenzhen (CN); Huangwei Wu, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 777 days.

(21) Appl. No.: 15/030,515

(22) PCT Filed: Jan. 4, 2015

(86) PCT No.: PCT/CN2015/070028
§ 371 (c)(1),
(2) Date: Apr. 19, 2016

(87) PCT Pub. No.: WO2016/106772
PCT Pub. Date: Jul. 7, 2016

(65) Prior Publication Data
US 2016/0335326 A1 Nov. 17, 2016

(51) Int. Cl.
*G06F 16/248* (2019.01)
*G06F 16/955* (2019.01)
*G06F 16/951* (2019.01)

(52) U.S. Cl.
CPC .......... *G06F 16/248* (2019.01); *G06F 16/951* (2019.01); *G06F 16/955* (2019.01)

(58) Field of Classification Search
CPC ..... G06F 16/248; G06F 16/955; G06F 16/951
See application file for complete search history.

(56) References Cited

U.S. PATENT DOCUMENTS

| 2008/0115226 A1* | 5/2008 | Welingkar | G06F 21/88 |
| | | | 726/28 |
| 2010/0094853 A1* | 4/2010 | Telloli | G06F 16/951 |
| | | | 707/706 |

(Continued)

FOREIGN PATENT DOCUMENTS

| CN | 101944112 A | 1/2011 |
| CN | 101957845 A | 1/2011 |

(Continued)

OTHER PUBLICATIONS

Partial English Translation and Abstract of Chinese Patent Application No. CN102902773, Nov. 2, 2016, 17 pages.

(Continued)

*Primary Examiner* — Amanda L Willis
(74) *Attorney, Agent, or Firm* — Conley Rose, P.C.

(57) ABSTRACT

An information search method and apparatus includes receiving search information entered by a user, acquiring, according to the search information, at least one search element and at least one piece of key information associated with each search element, sending the at least one piece of key information associated with each search element, to at least one search application corresponding to the search element such that the at least one search application performs a search according to the at least one piece of key information associated with the search element, and receiving search results returned by the at least one search application, and outputting the search results.

12 Claims, 3 Drawing Sheets

(56) References Cited

U.S. PATENT DOCUMENTS

| | | | | |
|---|---|---|---|---|
| 2010/0287175 A1* | 11/2010 | Beaudreau | ............ | G06F 16/951 |
| | | | | 707/759 |
| 2013/0018865 A1* | 1/2013 | Regan | ................... | G06F 16/487 |
| | | | | 707/706 |
| 2015/0261868 A1 | 9/2015 | Li | | |

FOREIGN PATENT DOCUMENTS

| | | |
|---|---|---|
| CN | 102236878 A | 11/2011 |
| CN | 102902773 A | 1/2013 |
| CN | 103646039 A | 3/2014 |
| CN | 103838856 A | 6/2014 |

OTHER PUBLICATIONS

Foreign Communication From a Counterpart Application, PCT Application No. PCT/CN2015/070028, English Translation of International Search Report dated Oct. 9, 2015, 2 pages.
Foreign Communication From a Counterpart Application, PCT Application No. PCT/CN2015/070028, Written Opinion dated Oct. 9, 2015, 3 pages.
Machine Translation and Abstract of Chinese Publication No. CN101944112, Jan. 12, 2011, 15 pages.
Machine Translation and Abstract of Chinese Publication No. CN101957845, Jan. 26, 2011, 10 pages.
Machine Translation and Abstract of Chinese Publication No. CN102236878, Nov. 9, 2011, 13 pages.
Machine Translation and Abstract of Chinese Publication No. CN103646039, Mar. 19, 2014, 13 pages.
Foreign Communication From a Counterpart Application, Chinese Application No. 201580000434.4, Chinese Office Action dated Sep. 19, 2018, 10 pages.

* cited by examiner

INFORMATION SEARCH METHOD AND APPARATUS

CROSS-REFERENCE TO RELATED APPLICATION

This application is a U.S. National Stage of International Application No. PCT/CN2015/070028, filed on Jan. 4, 2015, which is hereby incorporated by reference in its entirety.

TECHNICAL FIELD

The present disclosure relates to the field of Internet technologies, and in particular, to an information search method and apparatus.

BACKGROUND

Generally, for a search, a search subject requires multiple search elements, and each search element requires multiple pieces of key information to perform the search. For example, when a search subject is travel, a search element may be lodging, weather, and vehicles, and key information may be a travel time, a place of departure, scenic spots, and a quantity of persons. Currently, many search applications can provide search results for only a part of search elements in these search elements. For example, a lodging application can provide only a lodging search result, a weather application can provide only a weather search result, and a board and lodging application can provide only a lodging search result and a catering search result. In an actual application scenario, a user needs to enter key information in multiple search applications, and each search application outputs different search results. Therefore, the user needs to combine these search results manually. As may be seen, the foregoing manner reduces information search efficiency.

SUMMARY

Embodiments of the present disclosure disclose an information search method and apparatus, which are used to improve information search efficiency.

A first aspect of the embodiments of the present disclosure discloses an information search method, including receiving search information entered by a user, acquiring, according to the search information, at least one search element and at least one piece of key information associated with each search element, sending the at least one piece of key information associated with each search element, to at least one search application corresponding to the search element such that the at least one search application performs a search according to the at least one piece of key information associated with the search element, and receiving search results returned by the at least one search application, and outputting the search results.

With reference to the first aspect of the embodiments of the present disclosure, in a first possible implementation manner of the first aspect of the embodiments of the present disclosure, sending the at least one piece of key information associated with each search element, to at least one search application corresponding to the search element includes sending, according to a preset rule, the at least one piece of key information associated with each search element, to the at least one search application corresponding to the search element, where the preset rule includes at least one of the following rules: a pre-acquired table of correspondences between search elements and search applications, a historical record about use of search applications by the user, and ranking of search applications.

With reference to the first aspect of the embodiments of the present disclosure, in a second possible implementation manner of the first aspect of the embodiments of the present disclosure, acquiring, according to the search information, at least one search element and at least one piece of key information associated with each search element includes identifying a search subject of the search information, and acquiring search elements required by the search subject and at least one piece of key information associated with each search element.

With reference to the second possible implementation manner of the first aspect of the embodiments of the present disclosure, in a third possible implementation manner of the first aspect of the embodiments of the present disclosure, acquiring search elements required by the search subject and at least one piece of key information associated with each search element includes extracting key information from the search information, acquiring the search elements required by the search subject and key information required by the search subject, determining whether the extracted key information includes all the key information required by the search subject, and if the extracted key information includes all the key information required by the search subject, determining, according to the extracted key information, the at least one piece of key information associated with each search element.

With reference to the second possible implementation manner of the first aspect of the embodiments of the present disclosure, in a fourth possible implementation manner of the first aspect of the embodiments of the present disclosure, acquiring search elements required by the search subject and at least one piece of key information associated with each search element includes extracting key information from the search information, acquiring the search elements required by the search subject and key information required by the search subject, determining whether the extracted key information includes all the key information required by the search subject, if the extracted key information does not include all the key information required by the search subject, acquiring key information other than the extracted key information in the key information required by the search subject, and determining, according to the extracted key information and the acquired key information, the at least one piece of key information associated with each search element.

With reference to the fourth possible implementation manner of the first aspect of the embodiments of the present disclosure, in a fifth possible implementation manner of the first aspect of the embodiments of the present disclosure, acquiring key information other than the extracted key information in the key information required by the search subject includes outputting prompt information for prompting the user to enter the key information other than the extracted key information in the key information required by the search subject, and detecting the key information that is entered by the user for the prompt information, and/or acquiring, from user data, the key information other than the extracted key information in the key information required by the search subject, where the user data includes a geographical location of user equipment, a user calendar reminder, a user schedule, a user memo, and a user historical record.

With reference to the first aspect of the embodiments of the present disclosure and any one of the first to fifth possible implementation manners of the first aspect of the embodiments of the present disclosure, the receiving search results returned by the at least one search application, and outputting the search results include receiving the search results returned by the at least one search application, selecting, from search results of each search element, a target search result of the search element, where the target search result is at least one search result in the search results of the search element, and outputting a target search scheme including a combination of target search results of all the search elements.

With reference to the sixth possible implementation manner of the first aspect of the embodiments of the present disclosure, in a seventh possible implementation manner of the first aspect of the embodiments of the present disclosure, after outputting a target search scheme including a combination of target search results of all the search elements, the method further includes detecting a selection instruction that is entered by the user for the target search scheme, in response to the selection instruction, separately generating an operation instruction for each search result included in the target search scheme, and sending each operation instruction to a search application that searches for a search result corresponding to the operation instruction such that the search application receiving the operation instruction executes the operation instruction.

A second aspect of the embodiments of the present disclosure discloses an information search apparatus, including a receiving unit configured to receive search information entered by a user, an acquiring unit configured to acquire, according to the search information received by the receiving unit, at least one search element and at least one piece of key information associated with each search element, a sending unit configured to send the at least one piece of key information associated with each search element acquired by the acquiring unit, to at least one search application corresponding to the search element such that the at least one search application performs a search according to the at least one piece of key information associated with the search element, and an output unit configured to receive search results returned by the at least one search application, and output the search results.

With reference to the second aspect of the embodiments of the present disclosure, in a first possible implementation manner of the second aspect of the embodiments of the present disclosure, the sending unit is further configured to send, according to a preset rule, the at least one piece of key information associated with each search element, to the at least one search application corresponding to the search element, where the preset rule includes at least one of the following rules a pre-acquired table of correspondences between search elements and search applications, a historical record about use of search applications by the user, and ranking of search applications.

With reference to the second aspect of the embodiments of the present disclosure, in a second possible implementation manner of the second aspect of the embodiments of the present disclosure, the acquiring unit includes an identifying subunit configured to identify a search subject of the search information, and an acquiring subunit configured to acquire search elements required by the search subject identified by the identifying subunit and at least one piece of key information associated with each search element.

With reference to the second possible implementation manner of the second aspect of the embodiments of the present disclosure, in a third possible implementation manner of the second aspect of the embodiments of the present disclosure, the acquiring subunit is further configured to extract key information from the search information, acquire the search elements required by the search subject and key information required by the search subject, determine whether the extracted key information includes all the key information required by the search subject, and determine, according to the extracted key information, the at least one piece of key information associated with each search element if the extracted key information includes all the key information required by the search subject.

With reference to the second possible implementation manner of the second aspect of the embodiments of the present disclosure, in a fourth possible implementation manner of the second aspect of the embodiments of the present disclosure, the acquiring subunit is further configured to extract key information from the search information, acquire the search elements required by the search subject and key information required by the search subject, determine whether the extracted key information includes all the key information required by the search subject, if the extracted key information does not include all the key information required by the search subject, acquire key information other than the extracted key information in the key information required by the search subject, and determine, according to the extracted key information and the acquired key information, the at least one piece of key information associated with each search element.

With reference to the fourth possible implementation manner of the second aspect of the embodiments of the present disclosure, in a fifth possible implementation manner of the second aspect of the embodiments of the present disclosure, a manner of the acquiring key information other than the extracted key information in the key information required by the search subject further includes outputting prompt information for prompting the user to enter the key information other than the extracted key information in the key information required by the search subject, and detecting the key information that is entered by the user for the prompt information, and/or acquiring, from user data, the key information other than the extracted key information in the key information required by the search subject, where the user data includes a geographical location of user equipment, a user calendar reminder, a user schedule, a user memo, and a user historical record.

With reference to the second aspect of the embodiments of the present disclosure and any one of the first to fifth possible implementation manners of the second aspect of the embodiments of the present disclosure, in a sixth possible implementation manner of the second aspect of the embodiments of the present disclosure, the output unit includes a receiving subunit configured to receive the search results returned by the at least one search application, a selecting subunit configured to select, from search results of each search element that are received by the receiving subunit, a target search result of the search element, where the target search result is at least one search result in the search results of the search element, and an output subunit configured to combine target search results that are selected by the selecting subunit, of all the search elements into a target search scheme, and output the target search scheme.

With reference to the sixth possible implementation manner of the second aspect of the embodiments of the present disclosure, in a seventh possible implementation manner of the second aspect of the embodiments of the present disclosure, the receiving unit is further configured to detect a selection instruction that is entered by the user for the target search scheme output by the output subunit. The apparatus further includes a generation unit configured to, in response to the selection instruction received by the receiving unit, separately generate an operation instruction for each search result included in the target search scheme, and the sending unit is further configured to send each operation instruction generated by the generation unit to a search application that searches for a search result corresponding to the operation instruction such that the search application receiving the operation instruction executes the operation instruction.

A third aspect of the embodiments of the present disclosure discloses an information search apparatus, including a processor, a memory, an input apparatus, and an output apparatus, where the input apparatus is configured to receive search information entered by a user, and send the search information to the processor. The memory stores a group of program code, and the processor is configured to invoke the program code stored in the memory to execute the following operations: acquiring, according to the search information, at least one search element and at least one piece of key information associated with each search element, sending the at least one piece of key information associated with each search element, to at least one search application corresponding to the search element such that the at least one search application performs a search according to the at least one piece of key information associated with the search element, and receiving search results returned by the at least one search application. The output apparatus is configured to output the search results returned by the at least one search application.

With reference to the third aspect of the embodiments of the present disclosure, in a first possible implementation manner of the third aspect of the embodiments of the present disclosure, a manner of sending, by the processor, the at least one piece of key information associated with each search element, to at least one search application corresponding to the search element, further includes sending, according to a preset rule, the at least one piece of key information associated with each search element, to the at least one search application corresponding to the search element, where the preset rule includes at least one of the following rules a pre-acquired table of correspondences between search elements and search applications, a historical record about use of search applications by the user, and ranking of search applications.

With reference to the third aspect of the embodiments of the present disclosure, in a second possible implementation manner of the third aspect of the embodiments of the present disclosure, a manner of acquiring, by the processor according to the search information, at least one search element and at least one piece of key information associated with each search element, further includes identifying a search subject of the search information, and acquiring search elements required by the search subject and at least one piece of key information associated with each search element.

With reference to the second possible implementation manner of the third aspect of the embodiments of the present disclosure, in a third possible implementation manner of the third aspect of the embodiments of the present disclosure, a manner of acquiring, by the processor, search elements required by the search subject and at least one piece of key information associated with each search element, further includes extracting key information from the search information, acquiring the search elements required by the search subject and key information required by the search subject, determining whether the extracted key information includes all the key information required by the search subject, and determining, according to the extracted key information, the at least one piece of key information associated with each search element if the extracted key information includes all the key information required by the search subject.

With reference to the second possible implementation manner of the third aspect of the embodiments of the present disclosure, in a fourth possible implementation manner of the third aspect of the embodiments of the present disclosure, a manner of acquiring, by the processor, search elements required by the search subject and at least one piece of key information associated with each search element, further includes extracting key information from the search information, acquiring the search elements required by the search subject and key information required by the search subject, determining whether the extracted key information includes all the key information required by the search subject, if the extracted key information does not include all the key information required by the search subject, acquiring key information other than the extracted key information in the key information required by the search subject, and determining, according to the extracted key information and the acquired key information, the at least one piece of key information associated with each search element.

With reference to the fourth possible implementation manner of the third aspect of the embodiments of the present disclosure, in a fifth possible implementation manner of the third aspect of the embodiments of the present disclosure, a manner of acquiring, by the processor, key information other than the extracted key information in the key information required by the search subject, further includes outputting prompt information for prompting the user to enter the key information other than the extracted key information in the key information required by the search subject, and detecting the key information that is entered by the user for the prompt information, and/or acquiring, from user data, the key information other than the extracted key information in the key information required by the search subject, where the user data includes a geographical location of user equipment, a user calendar reminder, a user schedule, a user memo, and a user historical record.

With reference to the third aspect of the embodiments of the present disclosure and any one of the first to fifth possible implementation manners of the third aspect of the embodiments of the present disclosure, in a sixth possible implementation manner of the third aspect of the embodiments of the present disclosure, a manner of receiving, by the processor, search results returned by the at least one search application, further includes receiving the search results returned by the at least one search application, and selecting, from search results of each search element, a target search result of the search element, where the target search result is at least one search result in the search results of the search element. The output apparatus is further configured to output a target search scheme including a combination of target search results of all the search elements.

With reference to the sixth possible implementation manner of the third aspect of the embodiments of the present disclosure, in a seventh possible implementation manner of the third aspect of the embodiments of the present disclosure, after the processor outputs a target search scheme including a combination of the target search results of all the search elements, the input apparatus is further configured to detect a selection instruction that is entered by the user for the target search scheme, and send the selection instruction to the processor, and the processor is further configured to invoke the program code stored in the memory to execute the following operations: in response to the selection instruction, separately generating an operation instruction for each search result included in the target search scheme, and sending each operation instruction to a search application that searches for a search result corresponding to the operation instruction such that the search application receiving the operation instruction executes the operation instruction.

In the embodiments of the present disclosure, a user needs to enter a piece of search information in only one application. The application automatically acquires, according to the search information, at least one search element and at least one piece of key information associated with each search element, sends the at least one piece of key information associated with each search element, to at least one search application corresponding to the search element such that the at least one search application performs a search according to the at least one piece of key information associated with the search element, and receives search results returned by the at least one search application, and outputs the search results. User operations may be reduced, and thereby information search efficiency is improved.

BRIEF DESCRIPTION OF DRAWINGS

To describe the technical solutions in the embodiments of the present disclosure more clearly, the following briefly introduces the accompanying drawings required for describing the embodiments. The accompanying drawings in the following description show merely some embodiments of the present disclosure, and a person of ordinary skill in the art may still derive other drawings from these accompanying drawings without creative efforts.

DESCRIPTION OF EMBODIMENTS

The following clearly and completely describes the technical solutions in the embodiments of the present disclosure with reference to the accompanying drawings in the embodiments of the present disclosure. The described embodiments are merely a part rather than all of the embodiments of the present disclosure. All other embodiments obtained by a person of ordinary skill in the art based on the embodiments of the present disclosure without creative efforts shall fall within the protection scope of the present disclosure.

The embodiments of the present disclosure disclose an information search method and apparatus, which are used to improve information search efficiency. Detailed descriptions are hereinafter provided separately.

Figure 1:
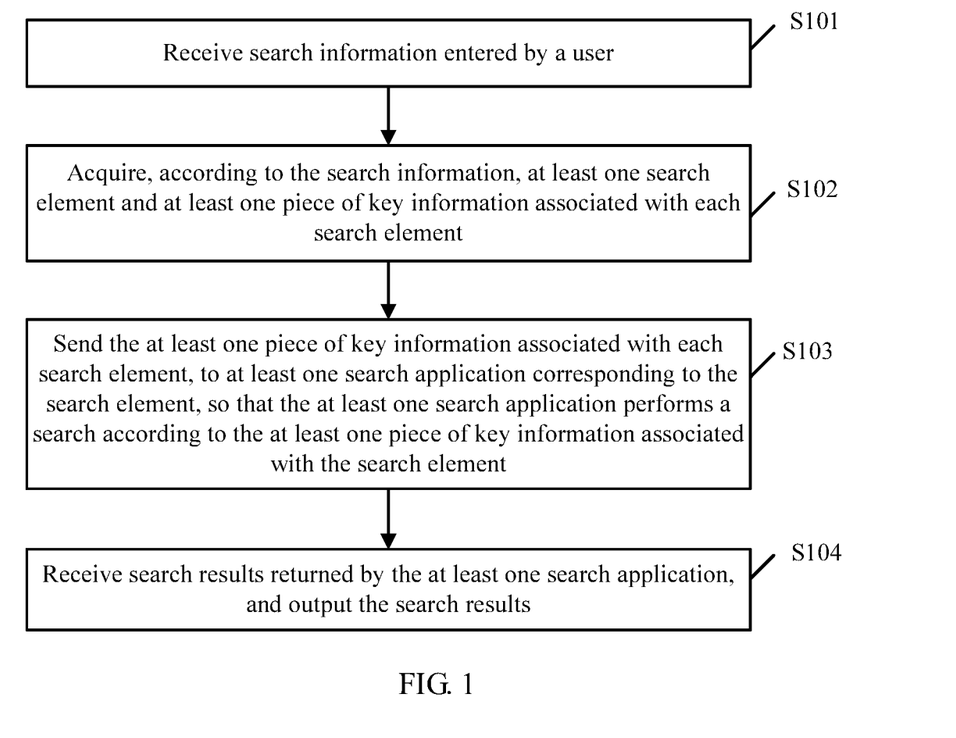
FIG. 1 is a flowchart of an information search method according to an embodiment of the present disclosure.

Referring to FIG. 1, FIG. 1 is a flowchart of an information search method according to an embodiment of the present disclosure. As shown in FIG. 1, the information search method may include the following steps.

Step S101: Receive search information entered by a user.

In this embodiment, the information search method may be executed by an application installed on user equipment, such as a smartphone, a tablet computer, a notebook computer, or a desktop computer. When the user needs to perform a search using the application, the user first enters a start instruction for starting the application. The user equipment starts the application according to the start instruction. Then, the user enters the search information in the application, and the application receives the search information entered by the user.

For example, the search information entered by the user may be that two persons from Shenzhen will travel to Jiuzhai Valley from October 1 to October 6.

Step S102: Acquire, according to the search information, at least one search element and at least one piece of key information associated with each search element.

In a possible implementation manner, acquiring, according to the search information, at least one search element and at least one piece of key information associated with each search element may include the following steps.

Step A: Identify a search subject of the search information.

In this embodiment, after receiving the search information entered by the user, the application identifies the search subject of the search information.

Step B: Acquire search elements required by the search subject and at least one piece of key information associated with each search element.

In a possible implementation manner, a manner of acquiring search elements required by the search subject and at least one piece of key information associated with each search element further includes extracting key information from the search information, acquiring the search elements required by the search subject and key information required by the search subject, determining whether the extracted key information includes all the key information required by the search subject, and if the extracted key information includes all the key information required by the search subject, determining, according to the extracted key information, the at least one piece of key information associated with each search element.

In a possible implementation manner, a manner of acquiring search elements required by the search subject and at least one piece of key information associated with each search element further includes extracting key information from the search information, acquiring the search elements required by the search subject and key information required by the search subject, determining whether the extracted key information includes all the key information required by the search subject, if the extracted key information does not include all the key information required by the search subject, acquiring key information other than the extracted key information in the key information required by the search subject, and determining, according to the extracted key information and the acquired key information, the at least one piece of key information associated with each search element.

In a possible implementation manner, a manner of acquiring key information other than the extracted key information in the key information required by the search subject further includes outputting prompt information for prompting the user to enter the key information other than the extracted key information in the key information required by the search subject, and detecting the key information that is entered by the user for the prompt information, and/or acquiring, from user data, the key information other than the extracted key information in the key information required by the search subject, where the user data includes a geographical location of the user equipment, a user calendar reminder, a user schedule, a user memo, and a user historical record.

In this embodiment, after the search subject is identified, the key information is extracted from the search information, and the key information required by the search subject and the search elements required by the search subject are acquired. The acquired key information required by the search subject and search elements required by the search subject may be stored by the application, or may be acquired using a network or a cloud server according to the search subject, which is not limited in this embodiment.

In this embodiment, whether the extracted key information includes all the key information required by the search subject is determined. If the extracted key information includes all the key information required by the search subject, the at least one piece of key information associated with each search element is determined according to the extracted key information, that is, the key information required for searching for each search element. If the extracted key information does not include all the key information required by the search subject, the key information other than the extracted key information in the key information required by the search subject is acquired, and the at least one piece of key information associated with each search element is determined according to the extracted key information and the acquired key information. The acquired key information other than the extracted key information in the key information required by the search subject may be obtained by directly querying the user, or may be obtained by querying the user data. The user data may be the geographical location of the user equipment, the user calendar reminder, the user schedule, the user memo, the user historical record, and the like. The user data may be data stored in the user equipment, or may be data stored at the cloud end. A type of the user data and a storage location of the user data are not limited in this embodiment.

For example, assuming that the search information entered by the user is that two persons from Shenzhen will travel to Jiuzhai Valley from October 1 to October 6, it may be identified, according to "travel", that the search subject is "travel". Assuming that key information required by "travel" includes a departure time, a place of departure, a return time, a destination, and a quantity of persons, and that search elements required by "travel" include lodging, catering, vehicles, and weather, the following key information may be extracted from "two persons from Shenzhen will travel to Jiuzhai Valley from October 1 to October 6": "the quantity of persons is 2", "the departure time is October 1", "the return time is October 6", "the place of departure is Shenzhen", and "the destination is Jiuzhai Valley". Therefore, the extracted key information includes all the key information required by "travel". The vehicles, for example, a plane, a high-speed railway, and a motor car, may be determined according to "2 persons", "October 1", "October 6", "Shenzhen", and "Jiuzhai Valley". The lodging may be determined according to "2 persons", "October 1", "October 6", and "Jiuzhai Valley". The weather and catering may be determined according to "October 1", "October 6", and "Jiuzhai Valley".

For example, assuming that the search information entered by the user is to travel to Jiuzhai Valley from October 1 to October 6, it may be identified, according to "travel", that the search subject is "travel". Assuming that key information required by "travel" includes a departure time, a place of departure, a return time, a destination, and a quantity of persons, and that search elements required by "travel" include lodging, catering, vehicles, and weather, the following key information may be extracted from "travel to Jiuzhai Valley from October 1 to October 6" "the departure time is October 1", "the return time is October 6", and "the destination is Jiuzhai Valley". It may be seen that the extracted key information does not include all the key information required by "travel". The place of departure and the quantity of persons are further required. Prompt information for prompting the user to enter the place of departure and the quantity of persons may be output such that the user enters the place of departure and the quantity of persons in the application, or a current geographical location of the user may be determined using the geographical location of the user equipment such that information about the place of departure is added automatically, and the schedule of the user from October 1 to October 6 is acquired by reading the user memo or user schedule such that the quantity of persons is obtained and added.

Step S103: Send the at least one piece of key information associated with each search element, to at least one search application corresponding to the search element such that the at least one search application performs a search according to the at least one piece of key information associated with the search element.

In this embodiment, a search request may be generated for each search element, and then each search request is separately sent to at least one search application, where the search request carries key information required for searching for a search element corresponding to the search request such that after receiving the search request, the search application performs a search according to the key information carried in the search request and returns search results to the application. The search application may be a local application, where the local application performs a search according to the received search request, and returns search results to the application after processing the search results, or the search application may be the network, where the network performs a search according to the received search request, and returns search results to the application after processing the search results, or the search application may be the cloud server, where the cloud server performs a search according to the received search request, and returns search results to the application after processing the search results. The search application is not limited in this embodiment. When the search application is the network or the cloud server, the search process is implemented by the network or the cloud server. Therefore, resource consumption of the user equipment may be reduced.

In a possible implementation manner, a manner of sending the at least one piece of key information associated with each search element, to at least one search application corresponding to the search element further includes sending, according to a preset rule, the at least one piece of key information associated with each search element, to the at least one search application corresponding to the search element, where the preset rule may include at least one of the following rules: a pre-acquired table of correspondences between search elements and search applications, a historical record about use of search applications by the user, and ranking of search applications.

In this embodiment, the application may store the pre-acquired table of correspondences between search elements and search applications, and may find, in the table of correspondences, a search application corresponding to each search element. Table 1 shows the pre-acquired table of correspondences between search elements and search applications. After all the key information of the search subject and the search elements required by the search subject are obtained, a search application that may be used for searching for each search element may be queried in the table of correspondences, and then a search request corresponding to each search element is sent to the search application that may be used for searching for the search element such that the search application performs a search according to the received search request and returns search results to the application. The table of correspondences between search elements and search applications may be adjusted according to search results of each search element that are returned by the search application when the user uses the application to search for each search element. During the adjustment, accuracy of the search results, a return time, a user acceptance status, an expansion status, and the like may be considered.

TABLE 1

Pre-acquired table of correspondences between search elements and search applications

| Search element | Search application |
|---|---|
| Lodging | Lodging search application 1, lodging search application 2, and a board and lodging application |
| Catering | Catering search application 1, catering search application 2, and a board and lodging application |
| Weather | Weather search application 1 and a weather search application 2 |
| ... | ... |

In this embodiment, the application may record an identifier of a search application used by the user for each search. When the user needs to use the application to perform a search, after all the key information of the search subject and the search elements required by the search subject are obtained, the search request corresponding to each search element is sent, according to the historical record about use of the search application by the user, to a search application that is frequently used by the user for searching for the search element such that the search application performs a search according to the received search request and returns search results to the application.

In this embodiment, the application may send the search request corresponding to each search element, to a top search application for searching for the search element, in the ranking of search applications such that the search application performs a search according to the received search request and returns search results to the application. The application may query the ranking of search applications locally, or may query, from an application store, an application market, or a server using the network, the ranking of search applications. The ranking of search applications may be ranking according to scores given by users, a count of downloads, and the like, which is not limited in this embodiment.

In a possible implementation manner, a manner of sending the at least one piece of key information associated with each search element, to at least one search application corresponding to the search element further includes separately sending each search element to all search applications for searching for the search element.

In this embodiment, the application may send the search request corresponding to each search element to all the search applications. When the search applications can search out search results of the search elements, the search applications return the search results to the application. When the search applications cannot search out search results of the search elements, the search applications do not return search results. When a search application can search out results of a search element, the search application may send, before searching out the search results, a message to the application, where the message is used to indicate that the search application may return search results for a search request such that the application knows search results of which search elements may be returned by each search application. After the application receives the search results of the search elements that can be returned by each search application, the application finishes collecting the search results in the current search. The search request corresponding to each search element may be sent to all the search applications in broadcast manner or group transmission manner, or the like.

In this embodiment, one search element may be searched for using multiple search applications. Therefore, a part of search applications in these search applications may be used as a preferred search application set for the search element, and another part of search applications in these search applications are used as a candidate search application set for the search element. When at least one search application is used for searching for each search element, for each search element, the preferred search application set for the search element may be first used for searching. The search applications corresponding to each search element may be grouped into the preferred search application set and the candidate search application set according to the historical record about use of search applications by the user and/or the ranking of search applications.

Step S104: Receive search results returned by the at least one search application, and output the search results.

In this embodiment, the search results may be displayed on a display screen of the user equipment, or the search results are output using a voice, which is not limited in this embodiment. The user may perform an operation on the search results on the user equipment in a touch, gesture, voice, or eyeball manner, or the like.

In a possible implementation manner, a manner of receiving search results returned by the at least one search application, and outputting the search results, further includes receiving the search results returned by the at least one search application, selecting, from search results of each search element, a target search result of the search element, where the target search result is at least one search result in the search results of the search element, and outputting a target search scheme including a combination of target search results of all the search elements.

In this embodiment, for a same search element, at least one search application is used for searching. After receiving search results returned by search applications, the application first unifies search results of the same search element that are returned by different search applications, then selects, from search results of each search element, a target search result of the search element, outputs, to the user, a target search scheme including a combination of target search results of all the search elements. The target search result is at least one search result in the search results of the search element. The target search scheme is any one search scheme in obtained search schemes.

For example, assuming that the search elements required by the search subject are lodging, vehicles, and catering, where a target search result of search lodging is a hotel A, a target search result of vehicles is an air flight B, and a target search result of catering is a restaurant C, then the target search scheme is the hotel A, the air flight B, and the restaurant C. The target search scheme is obtained according to a most preferential price, a shortest time, and the like.

In this embodiment, search results that are mutually associated may be processed to ensure properness of search results returned for one search subject of the user. During processing of the search results, some search results may be deleted, or the search results are prioritized, or the like. For example, if the return date of the user is October 6, a lodging search result dated October 6 should be deleted. If it is found, using a weather application, that a weather condition at the destination is not suitable for traveling, a suitable traveling scheme may be returned according to the search results. For example, if dense fog occurs on October 6, the application may increase priorities of the high-speed railway and railway in the search results, and reduce priorities of the plane and expressway in the search results.

In this embodiment, in the process of combining into the search scheme, if it is found that the search results returned using the preferred search application set are not ideal, the candidate search application may be used to perform a search and consolidation.

In this embodiment, the receiving, by the application, search information entered by a user, is implemented by the user equipment alone, but the acquiring, by the application according to the search information, at least one search element and at least one piece of key information associated with each search element, sending the at least one piece of key information associated with each search element, to at least one search application corresponding to the search element, and receiving search results returned by the at least one search application, and outputting the search results, may be implemented by the user equipment alone, or may be implemented by the cloud server alone, or may be implemented by the user equipment and the cloud server jointly, which is not limited in this embodiment.

In the information search method described in FIG. 1, a user needs to enter a piece of search information in only one application. The application automatically acquires, according to the search information, at least one search element and at least one piece of key information associated with each search element, sends the at least one piece of key information associated with each search element, to at least one search application corresponding to the search element such that the at least one search application performs a search according to the at least one piece of key information associated with the search element, and receives search results returned by the at least one search application, and outputs the search results. User operations may be reduced, and thereby information search efficiency is improved.

Figure 2:
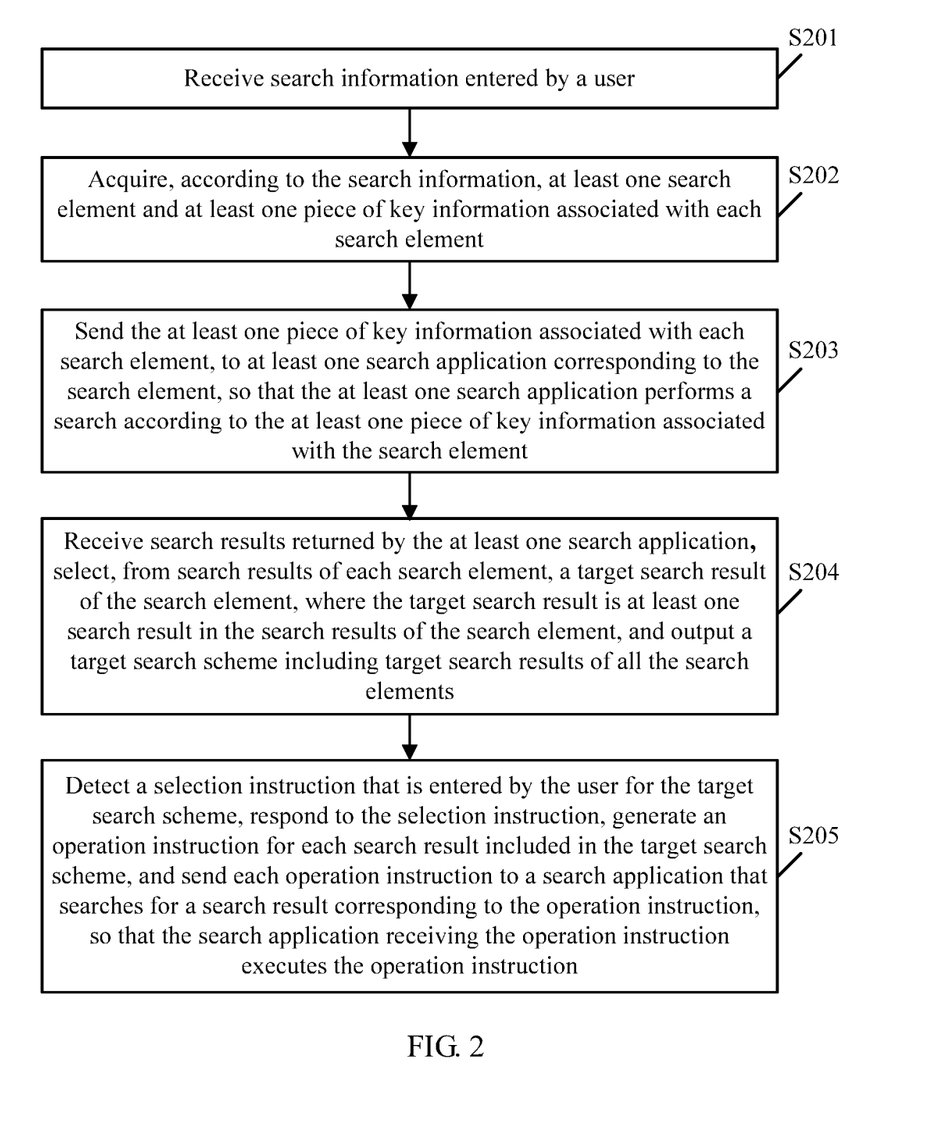
FIG. 2 is a flowchart of another information search method according to an embodiment of the present disclosure.

Referring to FIG. 2, FIG. 2 is a flowchart of another information search method according to an embodiment of the present disclosure. As shown in FIG. 2, the information search method may include the following steps.

Step S201: Receive search information entered by a user.

In this embodiment, the information search method may be executed by an application installed on user equipment, such as a smartphone, a tablet computer, a notebook computer, or a desktop computer. When the user needs to perform a search using the application, the user first enters a start instruction for starting the application. The user equipment starts the application according to the start instruction. Then, the user enters the search information in the application, and the application receives the search information entered by the user.

For example, the search information entered by the user may be that two persons from Shenzhen will travel to Jiuzhai Valley from October 1 to October 6.

Step S202: Acquire, according to the search information, at least one search element and at least one piece of key information associated with each search element.

In a possible implementation manner, acquiring, according to the search information, at least one search element and at least one piece of key information associated with each search element, may include the following steps.

Step A: Identify a search subject of the search information.

In this embodiment, after receiving the search information entered by the user, the application identifies the search subject of the search information.

Step B: Acquire search elements required by the search subject and at least one piece of key information associated with each search element.

In a possible implementation manner, a manner of acquiring search elements required by the search subject and at least one piece of key information associated with each search element further includes extracting key information from the search information, acquiring the search elements required by the search subject and key information required by the search subject, determining whether the extracted key information includes all the key information required by the search subject, and determining, according to the extracted key information, the at least one piece of key information associated with each search element if the extracted key information includes all the key information required by the search subject.

In a possible implementation manner, a manner of acquiring search elements required by the search subject and at least one piece of key information associated with each search element further includes extracting key information from the search information, acquiring the search elements required by the search subject and key information required by the search subject, determining whether the extracted key information includes all the key information required by the search subject, if the extracted key information does not include all the key information required by the search subject, acquiring key information other than the extracted key information in the key information required by the search subject, and determining, according to the extracted key information and the acquired key information, the at least one piece of key information associated with each search element.

In a possible implementation manner, a manner of acquiring key information other than the extracted key information in the key information required by the search subject further includes outputting prompt information for prompting the user to enter the key information other than the extracted key information in the key information required by the search subject, and detecting the key information that is entered by the user for the prompt information, and/or acquiring, from user data, the key information other than the extracted key information in the key information required by the search subject, where the user data includes a geographical location of the user equipment, a user calendar reminder, a user schedule, a user memo, and a user historical record.

In this embodiment, after the search subject is identified, the key information is extracted from the search information, and the key information required by the search subject and the search elements required by the search subject are acquired. The acquired key information required by the search subject and search elements required by the search subject may be stored by the application, or may be acquired using a network or a cloud server according to the search subject, which is not limited in this embodiment.

In this embodiment, whether the extracted key information includes all the key information required by the search subject is determined. If the extracted key information includes all the key information required by the search subject, the at least one piece of key information associated with each search element is determined according to the extracted key information, that is, the key information required for searching for each search element. If the extracted key information does not include all the key information required by the search subject, the key information other than the extracted key information in the key information required by the search subject is acquired, and the at least one piece of key information associated with each search element is determined according to the extracted key information and the acquired key information. The acquired key information other than the extracted key information in the key information required by the search subject may be obtained by directly querying the user, or may be obtained by querying the user data. The user data may be the geographical location of the user equipment, the user calendar reminder, the user schedule, the user memo, the user historical record, and the like. The user data may be data stored in the user equipment, or may be data stored at the cloud end. A type of the user data and a storage location of the user data are not limited in this embodiment.

For example, assuming that the search information entered by the user is that two persons from Shenzhen will travel to Jiuzhai Valley from October 1 to October 6, it may be identified, according to "travel", that the search subject is "travel". Assuming that key information required by "travel" includes a departure time, a place of departure, a return time, a destination, and a quantity of persons, and that search elements required by "travel" include lodging, catering, vehicles, and weather, the following key information may be extracted from "two persons from Shenzhen will travel to Jiuzhai Valley from October 1 to October 6": "the quantity of persons is 2", "the departure time is October 1", "the return time is October 6", "the place of departure is Shenzhen", and "the destination is Jiuzhai Valley". Therefore, the extracted key information includes all the key information required by "travel". The vehicles, for example, a plane, a high-speed railway, and a motor car, may be determined according to "2 persons", "October 1", "October 6", "Shenzhen", and "Jiuzhai Valley". The lodging may be determined according to "2 persons", "October 1", "October 6", and "Jiuzhai Valley". The weather and catering may be determined according to "October 1", "October 6", and "Jiuzhai Valley".

For example, assuming that the search information entered by the user is to travel to Jiuzhai Valley from October 1 to October 6, it may be identified, according to "travel", that the search subject is "travel". Assuming that key information required by "travel" includes a departure time, a place of departure, a return time, a destination, and a quantity of persons, and that search elements required by "travel" include lodging, catering, vehicles, and weather, the following key information may be extracted from "travel to Jiuzhai Valley from October 1 to October 6": "the departure time is October 1", "the return time is October 6", and "the destination is Jiuzhai Valley". It may be seen that the extracted key information does not include all the key information required by "travel". The place of departure and the quantity of persons are further required. Prompt information for prompting the user to enter the place of departure and the quantity of persons may be output such that the user enters the place of departure and the quantity of persons in the application, or a current geographical location of the user may be determined using the geographical location of the user equipment such that information about the place of departure is added automatically, and the schedule of the user from October 1 to October 6 is acquired by reading the user memo or user schedule such that the quantity of persons is obtained and added.

Step S203: Send the at least one piece of key information associated with each search element, to at least one search application corresponding to the search element such that the at least one search application performs a search according to the at least one piece of key information associated with the search element.

In this embodiment, a search request may be generated for each search element, and then each search request is separately sent to at least one search application, where the search request carries key information required for searching for a search element corresponding to the search request such that after receiving the search request, the search application performs a search according to the key information carried in the search request and returns search results to the application. The search application may be a local application, where the local application performs a search according to the received search request, and returns search results to the application after processing the search results, or the search application may be the network, where the network performs a search according to the received search request, and returns search results to the application after processing the search results, or the search application may be the cloud server, where the cloud server performs a search according to the received search request, and returns search results to the application after processing the search results. The search application is not limited in this embodiment. When the search application is the network or the cloud server, the search process is implemented by the network or the cloud server. Therefore, resource consumption of the user equipment may be reduced.

In a possible implementation manner, a manner of sending the at least one piece of key information associated with each search element, to at least one search application corresponding to the search element further includes sending, according to a preset rule, the at least one piece of key information associated with each search element, to the at least one search application corresponding to the search element, where the preset rule may include at least one of the following rules: a pre-acquired table of correspondences between search elements and search applications, a historical record about use of search applications by the user, and ranking of search applications.

In this embodiment, the application may store the pre-acquired table of correspondences between search elements and search applications, and may find, in the table of correspondences, a search application corresponding to each search element. Table 1 shows the pre-acquired table of correspondences between search elements and search applications. After all the key information of the search subject and the search elements required by the search subject are obtained, a search application that may be used for searching for each search element may be queried in the table of correspondences, and then a search request corresponding to each search element is sent to the search application that may be used for searching for the search element such that the search application performs a search according to the received search request and returns search results to the application. The table of correspondences between search elements and search applications may be adjusted according to search results of each search element that are returned by the search application when the user uses the application to search for each search element. During the adjustment, accuracy of the search results, a return time, a user acceptance status, an expansion status, and the like may be considered.

In this embodiment, the application may record an identifier of a search application used by the user for each search. When the user needs to use the application to perform a search, after all the key information of the search subject and the search elements required by the search subject are obtained, the search request corresponding to each search element is sent, according to the historical record about use of the search application by the user, to a search application that is frequently used by the user for searching for the search element such that the search application performs a search according to the received search request and returns search results to the application.

In this embodiment, the application may send the search request corresponding to each search element, to a top search application for searching for the search element, in the ranking of search applications such that the search application performs a search according to the received search request and returns search results to the application. The application may query the ranking of search applications locally, or may query, from an application store, an application market, or a server using the network, the ranking of search applications. The ranking of search applications may be ranking according to scores given by users, a count of downloads, and the like, which is not limited in this embodiment.

In a possible implementation manner, a manner of sending the at least one piece of key information associated with each search element, to at least one search application corresponding to the search element further includes separately sending each search element to all search applications for searching for the search element.

In this embodiment, the application may send the search request corresponding to each search element to all the search applications. When the search applications can search out search results of the search elements, the search applications return the search results to the application. When the search applications cannot search out search results of the search elements, the search applications do not return search results. When a search application can search out results of a search element, the search application may send, before searching out the search results, a message to the application, where the message is used to indicate that the search application may return search results for a search request such that the application knows search results of which search elements may be returned by each search application. After the application receives the search results of the search elements that can be returned by each search application, the application finishes collecting the search results in the current search. The search request corresponding to each search element may be sent to all the search applications in broadcast manner or group transmission manner, or the like.

In this embodiment, one search element may be searched for using multiple search applications. Therefore, a part of search applications in these search applications may be used as a preferred search application set for the search element, and another part of search applications in these search applications are used as a candidate search application set for the search element. When at least one search application is used for searching for each search element, for each search element, the preferred search application set for the search element may be first used for searching. The search applications corresponding to each search element may be grouped into the preferred search application set and the candidate search application set according to the historical record about use of search applications by the user and/or the ranking of search applications.

Step S204: Receive search results returned by the at least one search application, select, from search results of each search element, a target search result of the search element, where the target search result is at least one search result in the search results of the search element, and output a target search scheme including a combination of target search results of all the search elements.

In this embodiment, for a same search element, at least one search application is used for searching. After receiving search results returned by search applications, the application first unifies search results of the same search element that are returned by different search applications, then selects, from search results of each search element, a target search result of the search element, outputs, to the user, a target search scheme including a combination of target search results of all the search elements. The target search result is at least one search result in the search results of the search element. The target search scheme is any one search scheme in obtained search schemes.

In this embodiment, the target search scheme may be displayed on a display screen of the user equipment, or the target search scheme is output using a voice, which is not limited in this embodiment. The user may perform an operation on the target search scheme on the user equipment in a touch, gesture, voice, or eyeball manner, or the like.

For example, assuming that the search elements required by the search subject are lodging, vehicles, and catering, where a target search result of search lodging is a hotel A, a target search result of vehicles is an air flight B, and a target search result of catering is a restaurant C, then the target search scheme is the hotel A, the air flight B, and the restaurant C. The target search scheme is obtained according to a most preferential price, a shortest time, and the like.

In this embodiment, search results that are mutually associated may be processed to ensure properness of search results returned for one search subject of the user. During processing of the search results, some search results may be deleted, or the search results are prioritized, or the like. For example, if the return date of the user is October 6, a lodging search result dated October 6 should be deleted. If it is found, using a weather application, that a weather condition at the destination is not suitable for traveling, a suitable traveling scheme may be returned according to the search results. For example, if dense fog occurs on October 6, the application may increase priorities of the high-speed railway and railway in the search results, and reduce priorities of the plane and expressway in the search results.

In this embodiment, in the process of combining into the search scheme, if it is found that the search results returned using the preferred search application set are not ideal, the candidate search application may be used to perform a search and consolidation.

Step S205: Detect a selection instruction that is entered by the user for the target search scheme, in response to the selection instruction, generate an operation instruction for each search result included in the target search scheme, and send each operation instruction to a search application that searches for a search result corresponding to the operation instruction such that the search application receiving the operation instruction executes the operation instruction.

In this embodiment, after the application outputs the combined search scheme, when the user selects the target search scheme, the application detects the selection instruction that is entered by the user for the target search scheme, generates an operation instruction for each search result included in the target search scheme and sends each operation instruction to the search application that searches for the search result corresponding to the operation instruction such that the search application receiving the operation instruction executes the operation instruction.

For example, for a hotel search result, an operation instruction for booking a hotel is generated, for an air ticket search result, an operation instruction for booking an air ticket may be generated, and for a weather search result, an operation instruction for sending the search result to the user communications equipment may be generated.

In this embodiment, the application may invoke, according to a scheme selection result of the user, a system application interface to execute other operations related to the selected scheme, for example, after each operation instruction is sent to the search application, set a corresponding calendar reminder, set a geographical location, and book destination navigation. For example, for an air flight and a hotel that are already determined, an air flight boarding time reminder may be set, hotel location navigation after arrival at the destination is booked, and weather in a destination city is added in the weather application.

In this embodiment, when the user is not satisfied with the output search scheme, the user may reenter a search instruction, and the application uses the candidate search application set to perform a search again.

In this embodiment, interactions between the application and the user may be implemented by the user equipment alone, but processing of search information, processing of search results, and the like by the application may be implemented by the user equipment alone, or may be implemented by the cloud server alone, or may be implemented by the user equipment and the cloud server jointly, which is not limited in this embodiment.

In the information search method described in FIG. 2, a user needs to enter a piece of search information in only one application. The application automatically acquires, according to the search information, at least one search element and at least one piece of key information associated with each search element, sends the at least one piece of key information associated with each search element, to at least one search application corresponding to the search element such that the at least one search application performs a search according to the at least one piece of key information associated with the search element, and receives search results returned by the at least one search application, and outputs the search results. User operations may be reduced, and thereby information search efficiency is improved.

Figure 3:
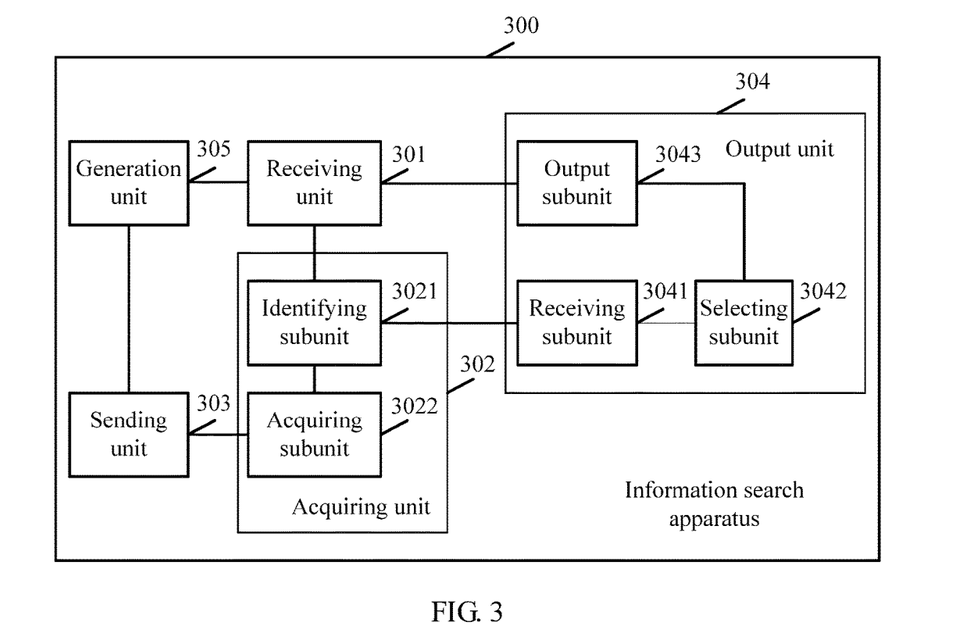
FIG. 3 is a structural diagram of an information search apparatus according to an embodiment of the present disclosure.

Referring to FIG. 3, FIG. 3 is a structural diagram of an information search apparatus according to an embodiment of the present disclosure. As shown in FIG. 3, the message search apparatus 300 may include a receiving unit 301 configured to receive search information entered by a user, an acquiring unit 302 configured to acquire, according to the search information received by the receiving unit 301, at least one search element and at least one piece of key information associated with each search element, a sending unit 303 configured to send the at least one piece of key information associated with each search element acquired by the acquiring unit 302, to at least one search application corresponding to the search element such that the at least one search application performs a search according to the at least one piece of key information associated with the search element, and an output unit 304 configured to receive search results returned by the at least one search application, and output the search results.

Further, the output unit 304 is further configured to receive the search results returned by the at least one search application, of each search element acquired by the acquiring unit 302.

In a possible implementation manner, the sending unit 303 is further configured to send, according to a preset rule, the at least one piece of key information associated with each search element, to the at least one search application corresponding to the search element, where the preset rule includes at least one of the following rules a pre-acquired table of correspondences between search elements and search applications, a historical record about use of search applications by the user, and ranking of search applications.

In a possible implementation manner, the acquiring unit 302 may include an identifying subunit 3021 configured to identify a search subject of the search information received by the receiving unit 301, and an acquiring subunit 3022 configured to acquire search elements required by the search subject identified by the identifying subunit 3021 and at least one piece of key information associated with each search element.

In a possible implementation manner, the acquiring subunit 3022 is further configured to extract key information from the search information, acquire the search elements required by the search subject and key information required by the search subject, determine whether the extracted key information includes all the key information required by the search subject, and if the extracted key information includes all the key information required by the search subject, determine, according to the extracted key information, the at least one piece of key information associated with each search element.

In a possible implementation manner, the acquiring subunit 3022 is further configured to extract key information from the search information, acquire the search elements required by the search subject and key information required by the search subject, determine whether the extracted key information includes all the key information required by the search subject, if the extracted key information does not include all the key information required by the search subject, acquire key information other than the extracted key information in the key information required by the search subject, and determine, according to the extracted key information and the acquired key information, the at least one piece of key information associated with each search element.

In a possible implementation manner, a manner of acquiring key information other than the extracted key information in the key information required by the search subject further includes outputting prompt information for prompting the user to enter the key information other than the extracted key information in the key information required by the search subject, and detecting the key information that is entered by the user for the prompt information, and/or acquiring, from user data, the key information other than the extracted key information in the key information required by the search subject, where the user data includes a geographical location of user equipment, a user calendar reminder, a user schedule, a user memo, and a user historical record.

In a possible implementation manner, the output unit 304 may include a receiving subunit 3041 configured to receive the search results returned by the at least one search application, a selecting subunit 3042 configured to select, from search results of each search element that are received by the receiving subunit 3041, a target search result of the search element, where the target search result is at least one search result in the search results of the search element, and an output subunit 3043 configured to combine target search results that are selected by the selecting subunit 3042, of all the search elements into a target search scheme, and output the target search scheme.

In a possible implementation manner, the receiving unit 301 is further configured to detect a selection instruction that is entered by the user for the target search scheme output by the output subunit 3043. The information search apparatus 300 may further include a generation unit 305 configured to, in response to the selection instruction received by the receiving unit 301, separately generate an operation instruction for each search result included in the target search scheme, and the sending unit 303 is further configured to send each operation instruction generated by the generation unit 305 to a search application that searches for a search result corresponding to the operation instruction such that the search application receiving the operation instruction executes the operation instruction.

In the information search apparatus described in FIG. 3, a user needs to enter a piece of search information in only one application. The application automatically acquires, according to the search information, at least one search element and at least one piece of key information associated with each search element, sends the at least one piece of key information associated with each search element, to at least one search application corresponding to the search element such that the at least one search application performs a search according to the at least one piece of key information associated with the search element, and receives search results returned by the at least one search application, and outputs the search results. User operations may be reduced, and thereby information search efficiency is improved.

Figure 4:
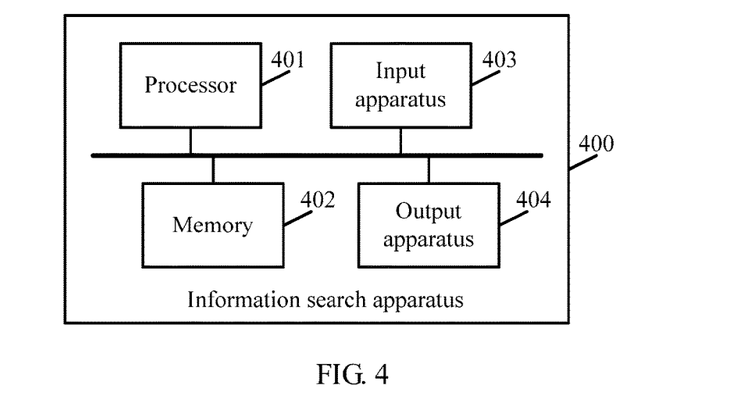
FIG. 4 is a structural diagram of another information search apparatus according to an embodiment of the present disclosure.

Referring to FIG. 4, FIG. 4 is a structural diagram of another information search apparatus according to an embodiment of the present disclosure. As shown in FIG. 4, the information search apparatus 400 may include a processor 401, a memory 402, an input apparatus 403, and an output apparatus 404. A bus or other manners may be used to connect the memory 402 to the processor 401, the input apparatus 403 to the processor 401, and the output apparatus 404 to the processor 401. In this embodiment, a connection using a bus is used as an example.

The input apparatus 403 is configured to receive search information entered by a user, and send the search information to the processor 401.

The memory 402 stores a group of program code, and the processor 401 is configured to invoke the program code stored in the memory 402 to execute the following operations: acquiring, according to the search information, at least one search element and at least one piece of key information associated with each search element, sending the at least one piece of key information associated with each search element, to at least one search application corresponding to the search element such that the at least one search application performs a search according to the at least one piece of key information associated with the search element, and receiving search results returned by the at least one search application.

The output apparatus 404 is configured to output the search results returned by the at least one search application.

In a possible implementation solution, a manner of sending, by the processor 401, the at least one piece of key information associated with each search element, to at least one search application corresponding to the search element, further includes sending, according to a preset rule, the at least one piece of key information associated with each search element, to the at least one search application corresponding to the search element, where the preset rule includes at least one of the following rules: a pre-acquired table of correspondences between search elements and search applications, a historical record about use of search applications by the user, and ranking of search applications.

In a possible implementation manner, a manner of acquiring, by the processor 401 according to the search information, at least one search element and at least one piece of key information associated with each search element, further includes identifying a search subject of the search information, and acquiring search elements required by the search subject and at least one piece of key information associated with each search element.

In a possible implementation manner, a manner of acquiring, by the processor 401, search elements required by the search subject and at least one piece of key information associated with each search element, further includes extracting key information from the search information, acquiring the search elements required by the search subject and key information required by the search subject, determining whether the extracted key information includes all the key information required by the search subject, and determining, according to the extracted key information, the at least one piece of key information associated with each search element if the extracted key information includes all the key information required by the search subject.

In a possible implementation manner, a manner of acquiring, by the processor 401, search elements required by the search subject and at least one piece of key information associated with each search element, further includes extracting key information from the search information, acquiring the search elements required by the search subject and key information required by the search subject, determining whether the extracted key information includes all the key information required by the search subject, if the extracted key information does not include all the key information required by the search subject, acquiring key information other than the extracted key information in the key information required by the search subject, and determining, according to the extracted key information and the acquired key information, the at least one piece of key information associated with each search element.

In a possible implementation manner, a manner of acquiring, by the processor 401, key information other than the extracted key information in the key information required by the search subject, further includes outputting prompt information for prompting the user to enter the key information other than the extracted key information in the key information required by the search subject, and detecting the key information that is entered by the user for the prompt information, and/or acquiring, from user data, the key information other than the extracted key information in the key information required by the search subject, where the user data includes a geographical location of user equipment, a user calendar reminder, a user schedule, a user memo, and a user historical record.

In a possible implementation manner, a manner of receiving, by the processor 401, search results returned by the at least one search application, further includes receiving the search results returned by the at least one search application, and selecting, from search results of each search element, a target search result of the search element, where the target search result is at least one search result in the search results of the search element, and the output apparatus is further configured to output a target search scheme including a combination of target search results of all the search elements.

In a possible implementation manner, after the processor 401 outputs a target search scheme including a combination of the target search results of all the search elements, the input apparatus 403 is further configured to detect a selection instruction that is entered by the user for the target search scheme, and send the selection instruction to the processor, and the processor 401 is further configured to invoke the program code stored in the memory 402 to execute the following operations: in response to the selection instruction, separately generating an operation instruction for each search result included in the target search scheme, and sending each operation instruction to a search application that searches for a search result corresponding to the operation instruction such that the search application receiving the operation instruction executes the operation instruction.

In the information search apparatus described in FIG. 4, a user needs to enter a piece of search information in only one application. The application automatically acquires, according to the search information, at least one search element and at least one piece of key information associated with each search element, sends the at least one piece of key information associated with each search element, to at least one search application corresponding to the search element such that the at least one search application performs a search according to the at least one piece of key information associated with the search element, and receives search results returned by the at least one search application, and outputs the search results. User operations may be reduced, and thereby information search efficiency is improved.

In an embodiment, an embodiment of the present disclosure further discloses a computer storage medium, where the computer storage medium stores a computer program, and when the computer program in the computer storage medium is read by a computer, the computer is enabled to implement all the steps in the information search methods disclosed by the embodiments of the present disclosure.

It should be noted that, for brief description, the foregoing method embodiments are represented as a series of actions. However, a person skilled in the art should appreciate that the present disclosure is not limited to the described order of the actions, because according to the present disclosure, some steps may be performed in other orders or simultaneously. In addition, a person skilled in the art should also understand that the embodiments described in this specification all belong to exemplary embodiments, and the involved actions and modules are not necessarily mandatory to the present disclosure.

Persons of ordinary skill in the art may understand that all or some of the steps of the methods in the embodiments may be implemented by a program instructing relevant hardware. The program may be stored in a computer readable storage medium. The storage medium may include a flash memory, a read-only memory (ROM), a random access memory (RAM), a magnetic disk, and an optical disc.

The information search method and apparatus provided in the embodiments of the present disclosure are described in detail above. The principle and implementation of the present disclosure are described herein through specific examples. The description about the embodiments of the present disclosure is merely provided to help understand the method and core ideas of the present disclosure. In addition, persons of ordinary skill in the art can make variations and modifications to the present disclosure in terms of the specific implementations and application scopes according to the ideas of the present disclosure. Therefore, the content of specification shall not be construed as a limit to the present disclosure.

What is claimed is:

1. An information search method, comprising:
receiving search information entered by a user;
acquiring, according to the search information, at least one search element and at least one key information associated with each of the at least one search element;
sending, according to a rank of at least two search applications, a search request comprising the at least one key information to a first search application of the at least two search applications that corresponds to the at least one search element so as to instruct the first search application to perform a search according to the at least one key information, wherein the first search application is a top ranked search application from the rank of the at least two search applications, and wherein the first search application is remote to and in communication with a user terminal;
receiving one or more search results from the first search application for each of the at least one search element;
selecting a target search result from the one or more search results for each of the at least one search element;
outputting a target search scheme responsive to selecting the target search result, wherein the target search scheme comprises a combination of the target search result for each of the at least one search element;
detecting a selection search scheme from the target search scheme;
sending an operation instruction corresponding to the selection search scheme to a second search application of the at least two search applications to permit the second search application to execute the operation instruction and retrieve a second search result corresponding to the operation instruction, wherein the second search application is different than the first search application and is in communication with the user terminal; and
receiving the second search result.

2. The information search method of claim 1, wherein acquiring the at least one search element and the at least one key information comprises:
identifying a search subject of the search information; and
acquiring a first set of search elements required by the search subject and the at least one key information associated with each of the at least one search element.

3. The information search method of claim 2, wherein acquiring the first set of search elements and the at least one key information comprises:
extracting a second key information from the search information;
acquiring the first set of search elements required by the search subject and the at least one key information required by the search subject;
determining whether the second key information comprises all of the first set of search elements required by the search subject; and
determining, according to the second key information, the at least one key information when the second key information comprises all of the first set of search elements.

4. The information search method of claim 2, wherein acquiring the search element and the at least one key information comprises:

extracting a second key information from the search information;
acquiring the first set of search elements required by the search subject and the at least one key information required by the search subject;
determining whether the second key information comprises all of the first set of search elements required by the search subject;
acquiring a third key information other than the second key information in the at least one key information when the second key information does not comprise all of the first set of search elements; and
determining, according to the second key information and the third key information, the at least one key information associated with each of the at least one search element.

5. The information search method of claim 4, wherein acquiring the third key information other than the second key information comprises:
outputting a prompt for prompting the user to enter the third key information;
detecting the third key information that is entered by the user for the prompt; and
acquiring, from a set of user data, the third key information, wherein the set of user data comprises a geographical location of user equipment, a user calendar reminder, a user schedule, a user memo, and a user historical record.

6. An information search apparatus, comprising:
a memory configured to store instructions;
an input apparatus coupled to the memory; and
an output apparatus coupled to the memory and the input apparatus, wherein the input apparatus is configured to:
receive search information entered by a user; and
send the search information to a processor;
the processor coupled to the memory, the input apparatus and the output apparatus, wherein the processor is configured to execute the instructions to:
acquire, according to the search information, at least one search element and at least one key information associated with each of the at least one search element;
send, according to a rank of at least two search applications, a search request comprising the at least one key information to a first search application of the at least two search applications that corresponds to the at least one search element so as to instruct the first search application to perform a search according to the at least one key information, wherein the first search application is a top ranked search application from the rank of the at least two search applications, and wherein the first search application is remote to and in communication with the information search apparatus;
receive, from the first search application, one or more search results for each of the at least one search element;
select a target search result from the one or more search results for each of the at least one search element, wherein the output apparatus is configured to output a target search scheme responsive to selecting the target search result, wherein the target search scheme comprises a combination of the target search result for each of the at least one search element, wherein the input apparatus is further configured to detect a selection search scheme from the target search scheme, and wherein the output apparatus is further configured to send an operation instruction corresponding to the selection search scheme to a second search application of the at least two search applications to permit the second search application to execute the operation instruction and retrieve a second search result corresponding to the operation instruction, wherein the second search application is different than the first search application and is in communication with the information search apparatus, and wherein the input apparatus is configured to receive the second search result.

7. The information search apparatus of claim 6, wherein the processor is further configured to:
identify a search subject of the search information; and
acquire a first set of search elements required by the search subject and at least one key information associated with each of the at least one search element.

8. The information search apparatus of claim 7, wherein the processor is further configured to:
extract a second key information from the search information;
acquire the first set of search elements required by the search subject and the at least one key information required by the search subject;
determine whether the second key information comprises all of the first set of search elements required by the search subject; and
determine, according to the second key information, the at least one key information when the second key information comprises all of the first set of search elements.

9. The information search apparatus of claim 7, wherein the processor is further configured to:
extract a second key information from the search information;
acquire the first set of search elements required by the search subject and the at least one key information required by the search subject;
determine whether the second key information comprises all of the first set of search elements required by the search subject;
acquire a third key information other than the second key information in the at least one key information when the second key information does not comprise all of the first set of search elements; and
determine, according to the second key information and the acquired third key information, the at least one key information associated with each of the at least one search element.

10. The information search apparatus of claim 9, wherein the processor is further configured to:
output a prompt for prompting the user to enter the third key information;
detect the third key information that is entered by the user for the prompt; and
acquire, from a set of user data, the third key information, wherein the set of user data comprises a geographical location of user equipment, a user calendar reminder, a user schedule, a user memo, and a user historical record.

11. The information search apparatus of claim 6, wherein the processor is further configured to:
receive the one or more search results returned by the first search application; and
select, from the one or more search results, the target search result associated with a first search element of the at least one search element, wherein the target search result is at least one search result in the one or more search results associated with the first search element, and wherein the output apparatus is further configured to output the target search scheme comprising a combination of the target search results for each of the at least one search element.

12. The information search apparatus of claim 11, wherein the input apparatus is further configured to:
- detect a selection instruction that is entered by the user for the target search scheme;
- send the selection instruction to the processor, and wherein the instructions further cause the processor to be configured to:
  - separately generate the operation instruction for each target search result comprised in the target search scheme in response to the selection instruction; and
  - send the operation instruction to a second search application that searches for the second search result corresponding to the operation instruction such that the second search application receiving the operation instruction executes the operation instruction.

* * * * *